Figure 1:
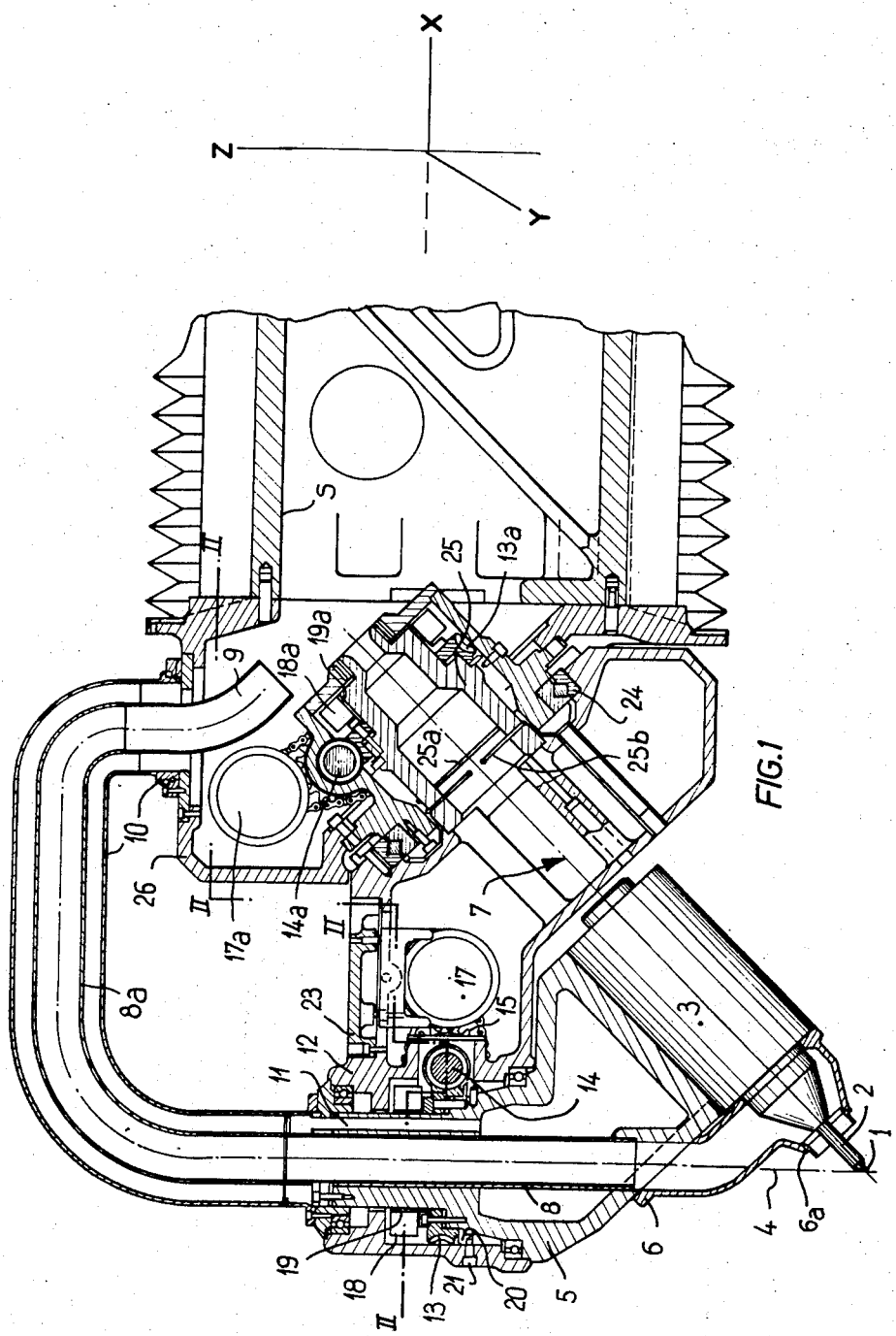

United States Patent [19]
Lecailtel et al.

[11] 3,828,649
[45] Aug. 13, 1974

[54] MILLING HEADS

[75] Inventors: Pierre Lecailtel; Bruno Dressler, both of Billancourt (Hauts de Seine), France

[73] Assignees: Regie Nationale Des Usines Renault, Billancourt; Automobiles Peugeot, Paris, both of, France

[22] Filed: Oct. 26, 1972

[21] Appl. No.: 300,965

[30] Foreign Application Priority Data
Oct. 26, 1971 France .............................. 71.38489

[52] U.S. Cl. ................................................. 90/15
[51] Int. Cl. ................................................ B23c 1/12
[58] Field of Search .......................... 90/14, 15, 17

[56] References Cited
UNITED STATES PATENTS

| | | | |
|---|---|---|---|
| 1,888,302 | 11/1932 | Weaver et al. | 90/15 |
| 2,046,624 | 7/1936 | Griffith | 90/14 |
| 3,359,861 | 12/1967 | Johnson et al. | 90/17 |
| 3,448,656 | 6/1969 | Bottger et al. | 90/17 |

FOREIGN PATENTS OR APPLICATIONS

| | | | |
|---|---|---|---|
| 1,390,888 | 1/1965 | France | 90/15 |
| 368,843 | 2/1923 | Germany | 90/17 |

*Primary Examiner*—Andrew R. Juhasz
*Assistant Examiner*—Z. R. Bilkinsky
*Attorney, Agent, or Firm*—Stevens, Davis, Miller & Mosher

[57] ABSTRACT

This milling head intended for machining complex evolutive surfaces in easily machinable materials for manufacturing mock-ups and patterns comprises a tool holder spindle having its axis adapted to pivot about a first axis inclined to the spindle axis and converging therewith to the tool point, said spindle pivot axis pivoting in turn about the second pivot axis while forming therewith the same angle as with the spindle axis, said first and second pivot axes being also coincident at a point corresponding to the tool point, said second axis being rigid with the frame structure supporting the milling head and being subjected to three movements along the conventional reference axes X, Y and Z of the machine. Thus, the tool holder spindle can swivel in all directions about the tool point.

6 Claims, 2 Drawing Figures

MILLING HEADS

The present invention relates in general to machine tools and has specific reference to a milling head for a digit control machine designed for machining evolutive surfaces, especially complex evolutive surfaces to be machined in easily machinable materials for making mock-ups and patterns.

Machining surfaces of this character implies a continuous movement of the tool along 3° of freedom, but in addition, in order to preserve satisfactory cutting conditions for the usually punctual tool, as a rule a taper milling cutter, the arrangement must be such that the tool axis should be able to evolve as a function of the contour or outline of the surface to be machined. It must also be able to assume any desired orientation in the tool and head clearing or disengagement space as a function of the workpiece contour.

Milling heads are already known which, in addition to the conventional 3° of freedom X, Y, Z, comprise means affording all possible swivel movements for the tool axis about the head point.

In these known structures the spindle and its driving motor are guided by a set of curved, concave and rectilinear slideways supporting the tool holder slide, the tool point being directed downwards and the assembly being adapted to rotate about a vertical axis.

The chief inconvenience of this arrangement is the bulky dimensions of the head, which is due to the use of heavy and cumbersome slideways, and also the limited amplitudes of the swivel movements that can be imparted to the tool, since said amplitudes are limited by the inner dimensions of a cone having a vertical axis with its apex directed downwards and corresponding to the tool point.

Milling heads having two inherent pivot axes permitting the swivelling of the tool spindle in all directions about the tool point are also known; however, these heads are rather heavy and ill suited for the accurate machining of evolutive surfaces.

It is the essential object of the present invention to provide an improved milling head of the type broadly set forth hereinabove and capable of easily performing the accurate machining of evolutive surfaces by using short, low-inertia kinematic drive means further characterised by a smooth, vibration-free operation.

Basically, the milling head according to this invention for a digit-controlled machine designed for machining evolutive surfaces and comprising, in addition to the means for controlling the tool position about the three axes X, Y, Z of the machine, a device for swivelling and retracting the tool holder spindle 3 as a function of the surfaces to be machined, the spindle axis being adapted to pivot about a first axis 4 set at 45° to said spindle axis and converging with the latter to the point 1 of tool 2, said spindle pivot axis 4 pivoting in turn about a second pivot axis forming therewith the same angle (45°) as with the spindle axis, said first and second pivot axes being also coincident at a point corresponding to the tool point, said second axis being solid with the frame structure supporting the milling head and adapted to move in three directions along the reference axes X, Y, Z of the machine, is characterised in that the angular movement about the pivot axes are controlled through worm and gear mechanisms driven from separate motors housed in supporting structures and operatively connected to said mechanisms through chain and sprocket transmissions incorporating a friction-type torque limiter adapted to absorb or eliminate jerks and shocks during the operation of the machine.

The smooth operation and the uniform speed of the movements are obtained more particularly by using a so-called "floating shoes" friction device. The semi-circular shoes clamping a cylindrical friction surface formed about the pivot axis have a cut profile forming on the one hand a thin, resilient semi-circular shoe, and on the other hand an anchoring lug having likewise a flexion resiliency and connected to the shoe by a common end and having a curvature concentric to that of said shoe, the other end being rigid with the frame structure. With this arrangement the braking pressure is distributed uniformly while affording certain dimensional tolerances during the manufacture of the device.

The first pivot axis consists of a hollow shaft connected to a casing covering concentrically the spindle end, surrounding with a circular aperture the tool shank, and acting as a chip suction duct by picking up the chips as they are formed while ensuring an efficient cooling of the point and shank of the tool by means of the air suction produced therethrough.

The rotational guiding about the second pivot axis is obtained by using a taper-roller bearing of relatively great diameter, the drive being transmitted to the rotary frame structure through an internal concentric barrel so cut or notched that it can transmit only a torque to the spindle supporting unit, the resiliency of this barrel, which results from the presence of its cut, slit or notched portions, being such that all flexion and expansion stresses are absorbed, as well as any vibration developipng during the machine operation.

Thus, the milling head thus constructed affords a complete range of swivel movement possibilities of the tool, obtained by combining two simple rotational movements. As a result, a light-weight yet rigid and compact construction is obtained. The degree of precision of the assembly is subordinate only to the convergence of the pivot axes and their 45° angles. The driving and friction-damping mechanisms are exactly the same for each movement.

The inherent resiliency of the materials is advantageously utilized in the present invention for selectively apportioning and distributing the loads by resorting to cutting and notching effects eliminating undesired rigidities and expensive high-grade machining tolerances.

These specific advantages are conducive to a low-cost milling head yet perfectly suited to its function.

Figure 2:
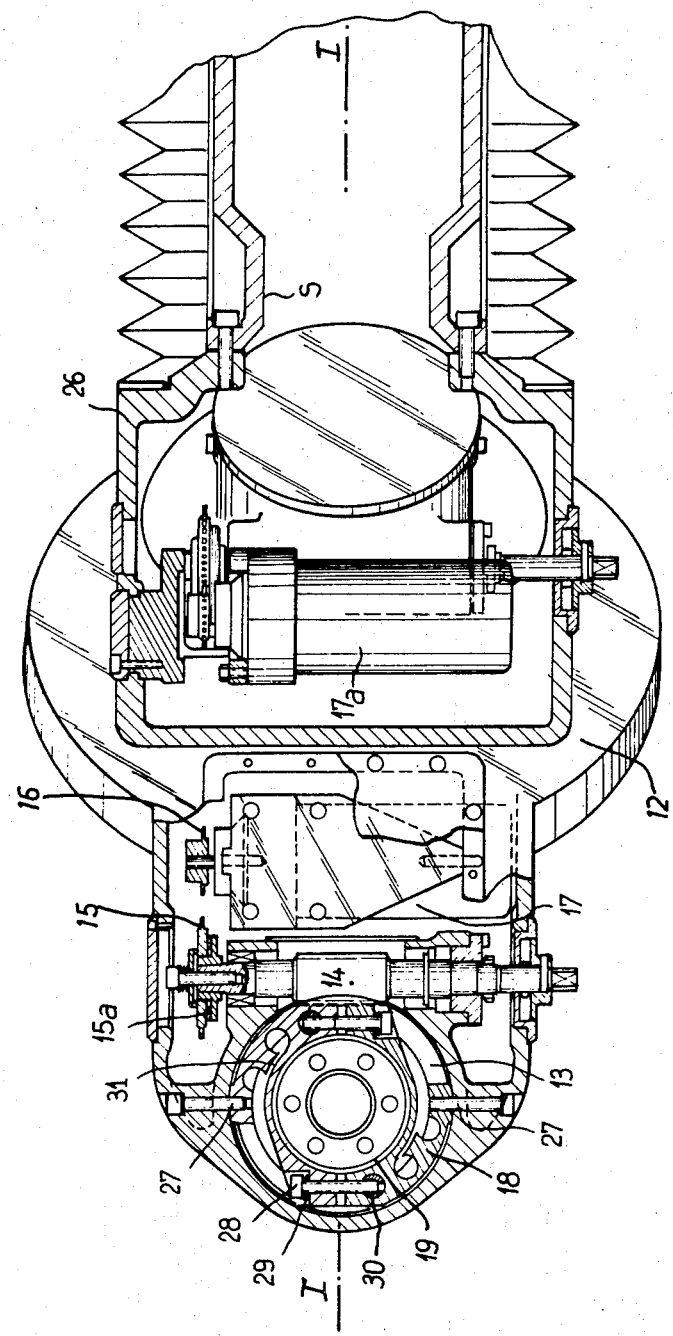

Other features and advantages of this invention will appear as the following description proceeds with reference to the accompanying drawings, in which:

FIG. 1 illustrates a milling head constructed according to the teachings of this invention and shown in section taken along the line I—I of FIG. 2, and FIG. 2 illustrates the same milling head as seen from above and in section taken along the line II—II of FIG. 1.

To simplify the drawing, the spindle axis is shown therein as being exactly coincident with the axis corresponding to the second pivotal movement.

If we consider firstly FIG. 1, the point 1 of tool 2 mounted in a spindle 3 is coincident with a point of the first pivot axis 4 about which the spindle supporting frame structure 5 is adapted to pivot. Secured to this frame structure is a chip suction duct 6 having a nozzle extension 6a surrounding the tool 2 and an opposite extension along the axis 4 in the form of a discharge tube 8 connected through a flexible extensible hose 8a to the pipe 9. Another flexible extensible hose 10 surrounds concentrically the first hose 8a and permits the passage, in the intermediate annular space formed therebetween, of electric conducting windings supplying the spindle motor and also of flexible pipings for supplying the necessary lubricating and cooling fluids, as the case may be. The channel 11 is formed in the barrel of a carrier or frame structure 5 to permit the passage of these conductors towards the spindle 3.

This barrel pivotally mounted on a pair of ballbearings in the arm of an intermediate carrier 12 is adapted to be rotatably driven through a gear 13 and a worm 14 driven in turn through a transmission comprising a pair of sprockets 15, 16 and a chain and incoporating a safety friction device interposed in this example at 15a between sprocket 15 and worm 14, and driven from a motor 17.

The worm and gear mechanism is enclosed in a tight casing also containing the bearings and friction shoes 18 coacting with the bearing sleeve 19. The frame or carrier member 5 further comprises an abutment portion 20 preventing its rotation by means of a set screw 21. The cover 23 permits an easy access to the motor 17 for fitting and adjusting same.

The pivotal mounting of the intermediate carrier 12 about the second axis 7 is provided for by the taper roller bearing 24. This carrier 12 is driven through the medium of a slit barrel 25 the axial elasticity of which is provided by means of two pairs of slits 25a, 25b having opposite direction and off-set by 90° to each other.

The rotary movements of carrier 12 about the axis 7 is obtained through a power device 17a, a chain and sprocket transmission and a worm and gear mechanism 14a, 13a, incorporating a friction-type damping device 18a, 19a, similar to the one permitting the pivoting movements about the axis 4. The corresponding members are also enclosed in a fluid-tight casing. O-rings or like seals are provided for sealing the above-mentioned slits of barrel 25 by surrounding same. The central aperture of this barrel permits the passage of the supply conductors to motor 17.

The fixed frame structure member 26 enclosing the motor and the mechanism for pivoting the carrier 12 is rigid with the main supporting frame S of the milling head which contains the drives for feeding the tool along the axes X, Y and Z of the machine.

In FIG. 2 the mode of assembling and the contour of the "floating" type friction shoes 18 are illustrated. These shoes 18 are secured by means of screws 27 at two diametrally opposed points of carrier 12 and interconnected by screws 28, resilient washers 29 and embedded nuts 30 to permit the adjustment of the friction pressure exerted by the shoes on the bearing sleeve 19. The concentric notch 31 obtained by drilling bores cleared by countersunk or milled recesses and sawing between the shoes and its fastening arm provide the cross-sectional reductions necessary to permit its elastic deformation for absorbing jerks and shocks during the operation of the machine.

Of course, various modifications and variations may be brought to the exemplary form of embodiment of the milling head given herein by way of illustration, without however departing from the basic principle of the invention as set forth in the appended claims.

What is claimed as new is:

1. Milling head for digit control machine adapted to machine evolutive surfaces comprising a tool holder spindle having an axis of rotation and adapted to engage a tool having an extending point, a carrier device for swivelling and retracting said tool holder spindle as a function of the surfaces to be machined, said carrier having first spindle means adapted to pivot said tool holder spindle about a first pivot axis set at 45° to said spindle axis, said carrier having second spindle means to pivot said first pivot axis about a second pivot axis which is at 45° to said first pivot axis, said first and second pivot axes intersecting at a point corresponding to the tool point, said second spindle means being in solid engagement with the frame structure supporting the milling head which is adapted to move in three directions along the reference axis X, Y and Z of the machine, first motor housed in said second spindle means connected via a chain and sprocket transmission through a safety friction means to a worm and gear mechanism engaging said first spindle means to control rotation about said first axis with a friction-type torque limiter secured by said second spindle means and engaging said first spindle means and adapted to absorb or eliminate jerks or shocks during operation of the machine, and second motor housed in said frame structure connected via a chain and sprocket transmission through a safety friction means to a worm and gear mechanism engaging said second spindle means to control rotation about said second axis with a friction-type torque limiter secured by said frame structure and engaging said second spindle means and adapted to absorb or eliminate jerks or shocks during operation of the machine.

2. Milling head according to claim 1 wherein said friction-type torque limiter for damping out the jerks and shocks likely to occur during the machine operation comprises a pair of "floating" shoes of semicircular configuration, each arcuate shoe comprising an inner arcuate member having a thin wall and adapted to be closed on a cylindrical friction surface about the pivot axis of the corresponding spindle means, and an outer arcuate member having a curvature concentric to that of said inner member and being rigid with the aforesaid means or structure on which said friction type torque limiter is secured, said arcuate members being resiliently connected at one common end to form a unitary resilient shoe.

3. Milling head according to claim 1, wherein the spindle of the first pivot axis is hollow and connected to a cover closing concentrically the spindle end and surrounding with a circular aperture the tool shank to constitute a chip suction duct so as to pick up the chips where and as they are formed, whule causing the suction air stream to cool the point and shank of said tool.

4. Milling head according to claim 3, wherein the first pivot axis is connected to said frame structure through a flexible extensible hose for discharging the chips, said hose being surrounded by another concentric extensible hose, the intermediate space between these hoses receiving the windings of the electric conductors or pipes for supplying power and fluid.

5. Milling head according to claim 1, wherein the means for guiding under rotational bearing conditions the tool carrier about the second pivot axis comprises an inclined taper-roller bearing of relatively large diameter, the drive being transmitted to the rotary carrier through a concentric internal barrel having slits cut therein so as to transmit to the spindle carrier assembly only the torque, the barrel elasticity resulting from the presence of said slits absorbing all flexion and expansion stresses and loads while damping out vibration produced during the operation of the machine.

6. Milling head according to claim 5, wherein the barrel controlling the spindle comprises two adjacent pairs of slits cut therein and opposed in a same plane with a relative off-set of 90°, an O-ring seal covering each pair of cut slits.

* * * * *